(12) United States Patent
Jenson

(10) Patent No.: US 10,990,896 B2
(45) Date of Patent: Apr. 27, 2021

(54) SYSTEMS AND METHODS FOR INCORPORATING LONG-TERM PATTERNS IN ONLINE FRAUD DETECTION

(71) Applicant: Facebook, Inc., Menlo Park, CA (US)

(72) Inventor: Daniel Adam Jenson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 925 days.

(21) Appl. No.: 15/418,536

(22) Filed: Jan. 27, 2017

(65) Prior Publication Data

US 2018/0218283 A1 Aug. 2, 2018

(51) Int. Cl.
*G06N 20/00* (2019.01)
*G06Q 50/00* (2012.01)
*G06Q 30/00* (2012.01)

(52) U.S. Cl.
CPC ......... *G06N 20/00* (2019.01); *G06Q 30/0185* (2013.01); *G06Q 50/01* (2013.01)

(58) Field of Classification Search
CPC ..... G06N 20/00; G06Q 30/0185; G06Q 50/01
See application file for complete search history.

(56) References Cited

U.S. PATENT DOCUMENTS

| | | | |
|---|---|---|---|
| 8,527,526 B1 * | 9/2013 | Liu | G06Q 30/0277 707/751 |
| 9,628,506 B1 | 4/2017 | Han et al. | |
| 2008/0154667 A1 * | 6/2008 | Kuo | G06Q 10/0635 705/14.46 |
| 2008/0275861 A1 | 11/2008 | Baluja et al. | |
| 2012/0215770 A1 | 8/2012 | Isaacson et al. | |
| 2014/0058763 A1 | 2/2014 | Zizzamia et al. | |
| 2014/0279306 A1 | 9/2014 | Shi et al. | |
| 2015/0081324 A1 * | 3/2015 | Adjaoute | G06Q 30/0185 705/2 |
| 2015/0161622 A1 | 6/2015 | Hoffmann et al. | |
| 2015/0264063 A1 | 9/2015 | Jenson | |
| 2015/0379405 A1 | 12/2015 | Jenson | |
| 2016/0154895 A1 | 6/2016 | Koutra et al. | |
| 2016/0156579 A1 * | 6/2016 | Kaufmann | H04L 51/22 709/206 |
| 2016/0267483 A1 | 9/2016 | Jenson | |

(Continued)

OTHER PUBLICATIONS

Github, Transfer Learning, Jan. 18, 2017, http://cs231n.github.io/transfer-learning/ (Year: 2017).*

(Continued)

*Primary Examiner* — Eric Nilsson
(74) *Attorney, Agent, or Firm* — Sheppard Mullin Richter & Hampton LLP

(57) ABSTRACT

Systems, methods, and non-transitory computer readable media can generate one or more first machine learning models, where each of the one or more first machine learning models is associated with a respective portion of a first period of time. A second machine learning model incorporating the one or more first machine learning models as features can be generated, where the second machine learning model is associated with a second period of time. A respective weight associated with each of the one or more first machine learning models can be determined. It can be determined whether a content item is associated with a category based on the second machine learning model.

20 Claims, 9 Drawing Sheets

(56) References Cited

U.S. PATENT DOCUMENTS

2016/0364794 A1 12/2016 Chari et al.
2018/0176241 A1* 6/2018 Manadhata ......... G06F 16/2477

OTHER PUBLICATIONS

Pan, Sinno Jialin, and Qiang Yang. "A survey on transfer learning." IEEE Transactions on knowledge and data engineering 22.10 (2009): 1345-1359. (Year: 2009).*
Pan, Sinno Jialin, et al. "Domain adaptation via transfer component analysis." IEEE Transactions on Neural Networks 22.2 (2010): 199-210. (Year: 2010).*

* cited by examiner

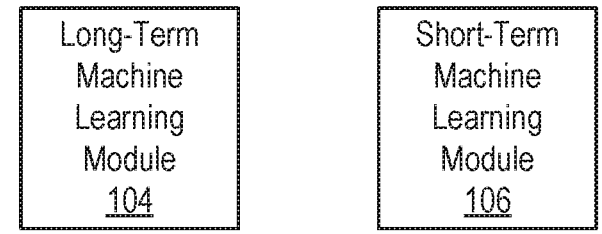
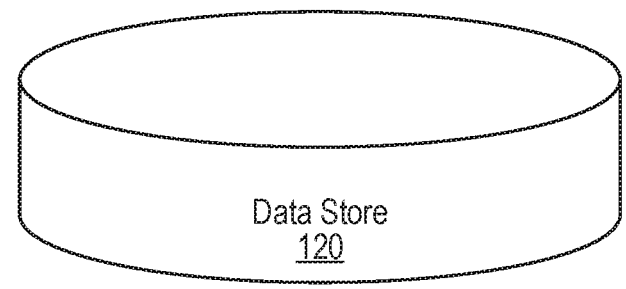
FIGURE 1

Short-Term Machine Learning Module 252

- Short-Term Training Module 254
- Short-Term Evaluation Module 256
- Action Module 258

Generate one or more first machine learning models, each of the one or more first machine learning models associated with a respective portion of a first period of time
402

Generate a second machine learning model incorporating the one or more first machine learning models as features, the second machine learning model associated with a second period of time
404

Determine a respective weight associated with each of the one or more first machine learning models
406

Determine whether a content item is associated with a category based on the second machine learning model
408

FIGURE 4

SYSTEMS AND METHODS FOR INCORPORATING LONG-TERM PATTERNS IN ONLINE FRAUD DETECTION

FIELD OF THE INVENTION

The present technology relates to online fraud detection. More particularly, the present technology relates to techniques for incorporating patterns in online fraud detection.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can post, share, and access various content items, such as status updates, images, videos, articles, and links, via the social networking system.

Various types of content can be created and presented in the social networking system. In some cases, content in the social networking system can be fraudulent. For example, certain advertisements can promote fake products or promote scams. Conventional approaches can detect fraud associated with content available through the social networking system.

SUMMARY

Various embodiments of the present disclosure can include systems, methods, and non-transitory computer readable media configured to generate one or more first machine learning models, where each of the one or more first machine learning models is associated with a respective portion of a first period of time. A second machine learning model incorporating the one or more first machine learning models as features can be generated, where the second machine learning model is associated with a second period of time. A respective weight associated with each of the one or more first machine learning models can be determined. It can be determined whether a content item is associated with a category based on the second machine learning model.

In some embodiments, the first period of time is divided into a plurality of portions based on a unit of time.

In certain embodiments, the first period of time is a year, the unit of time is a month, and the second period of time is a week.

In an embodiment, each of the one or more first machine learning models is trained based on respective first training data including content items associated with the respective portion of the first period of time.

In some embodiments, the second machine learning model is trained based on second training data including content items associated with the second period of time.

In certain embodiments, each of the one or more first machine learning models generates a score for a first content item in the second training data.

In an embodiment, the second training data indicates a score assigned to the first content item, and the respective weight is determined based on a comparison of the score assigned to the first content item and the scores generated by the one or more first machine learning models for the first content item.

In some embodiments, the category relates to online fraud and a pattern associated with the category is cyclical over the first period of time.

In certain embodiments, features associated with the one or more first machine learning models include one or more of: detection-based features or memory-based features.

In an embodiment, features associated with the one or more first machine learning models include one or more of: numeric features, text features, or image features.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example fraud detection module configured to detect fraud based on long-term patterns, according to an embodiment of the present disclosure.

FIG. 2B illustrates an example short-term machine learning module configured to provide a machine learning model trained based on short-term data, according to an embodiment of the present disclosure.

FIG. 4 illustrates an example first method for detecting fraud based on long-term patterns, according to an embodiment of the present disclosure.

Figure 2A:
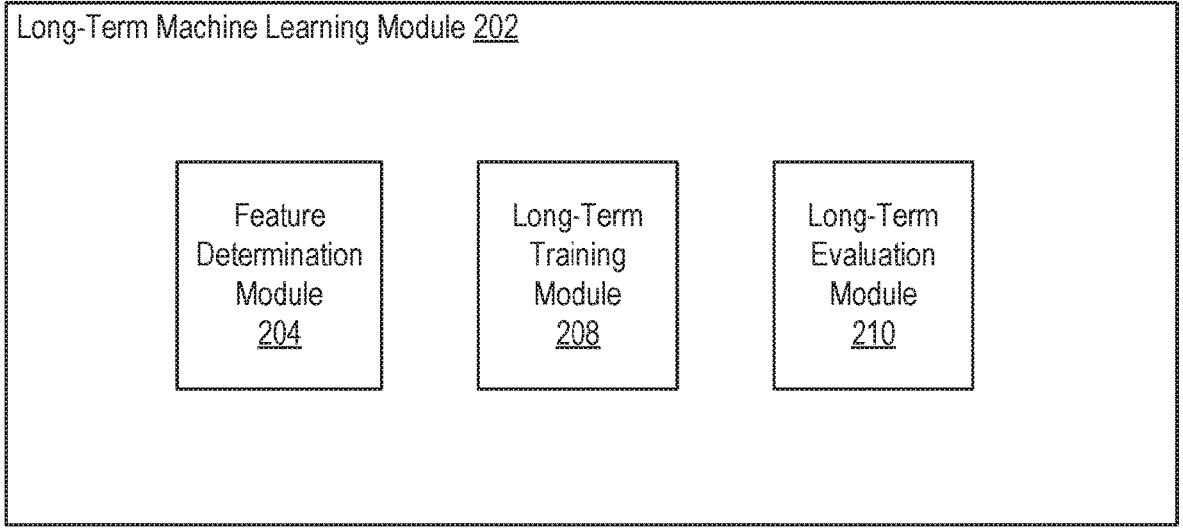
FIG. 2A illustrates an example long-term machine learning module configured to provide a machine learning model trained based on long-term data, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Incorporating Long-Term Patterns in Online Fraud Detection

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system can provide user profiles through which users may add connections or publish content items. The social networking system can also provide feeds associated with users, such as newsfeeds. The social networking system may also provide pages associated with entities.

Various types of content can be created and presented in the social networking system. In some cases, content in the social networking system can be fraudulent. For example, certain advertisements can promote fake products. Conventional approaches specifically arising in the realm of computer technology can detect fraud associated with content in the social networking system based on machine learning models trained using content data for a short period of time (e.g., a month). There can be a large amount of content data for the social networking system, and it can be difficult to train machine learning models on content data for a longer period of time (e.g., a year). However, different types of fraud can have patterns, such as cyclical patterns, that may occur over a longer period of time (e.g., a year). Such patterns would not be reflected adequately in machine learning models trained on content data from a short period of time. For example, a first type of fraud can have a seasonal pattern and may be more frequent during the summer, where as a second type of fraud can also have a seasonal pattern and may be more frequent during the winter. In this regard, a machine learning model trained on content data from the summer can weight features associated with the first type of fraud higher than features associated with the second type of fraud. However, in the winter, the second type of fraud becomes more frequent than the first type of fraud, and the machine learning models would not be able to detect the second type of fraud as successfully. Conventional approaches may retrain the machine learning models when a change occurs based on a pattern for a type of fraud, but the retrained machine learning models would still only reflect content data for a short period of time and would not be able to incorporate the pattern of the type of fraud over a longer period of time.

An improved approach rooted in computer technology can overcome the foregoing and other disadvantages associated with conventional approaches specifically arising in the realm of computer technology. Based on computer technology, the disclosed technology can detect fraud associated with content associated with a social networking system based on one or more machine learning models trained based on long-term content data and a machine learning model trained based on short-term content data. A machine learning model trained based on long-term content data, or a portion of long-term content data, can be referred to as a "long-term machine learning model," and a machine learning model trained based on short-term content data can be referred to as a "short-term machine learning model." A long-term machine learning model can capture a type of behavior and act as memory for that type of behavior. For example, the long-term machine learning model can capture a behavior based on a seasonal pattern, a particular event, etc. In some embodiments, a long-term machine learning model can be created based on a unit of time. Long-term content data can cover a specified period of time, which can be divided into a plurality of portions based on a unit of time. Short-term content data can cover a period of time that is shorter than the specified period of time for long-term content data. The period of time covered by the short-term content data may also be shorter than the unit of time for the long-term content data. A period of time for long-term content data, a unit of time for long-term content data, and a period of time for short-term content data can be selected as appropriate (e.g., a number of years, a year, a number of months, a month, a number of days, a day, etc.). A long-term machine learning model can be created for each unit of time. In an example, a period of time for the long-term content data can be a year, a unit of time for long-term content data can be a month, and a period of time for short-term content data can be a week. In this example, a long-term machine learning model can be created for each month of the year and can be trained based on content data for each month. A short-term machine learning model can be trained based on content data for a most recent week. Long-term machine learning models, or their associated outputs (e.g., predictive scores), can be incorporated into a short-term machine learning model as features and can be weighted based on short-term content data. For example, a weight for each long-term machine learning model can be determined based on the model's prediction results for the short-term content data. In this way, the short-term machine learning model can be trained on the short-term content data, but still incorporate a pattern for a type of fraud over a longer period of time. An amount of time for training machine learnings can be reduced by using one or more long-term machine learning models and a short-term machine learning model in combination. A trained short-term machine learning model can be applied to content associated with the social networking system, such as content items, to determine whether certain content is fraudulent or not. Features used to train machine learning models can relate to various types of content in the social networking system. Features can be divided into, for example, two categories: detection-based features and memory-based features. Detection-based features can refer to features that do not require any previous information for determining associated values. Memory-based features can refer to features that require some previous information for determining associated values. Features can have, for example, three different forms: number, text, and image. Based on the combination of categories and forms of features, there can be six different types of long-term machine learning model. For example, the six different types of long-term machine learning model can include detection-numeric, detection-text, detection-image, memory-numeric, memory-text, and memory-image. In some embodiments, a long-term machine learning model can be created based on an event, such as an attack. A long-term machine learning model can be created and trained after a fraud attack occurs such that the long-term machine learning model can capture a behavior from that attack. For example, a long-term machine learning model for an event can be created and trained based on a relevant portion of long-term content data associated with the event. Various embodiments of the disclosed technology are analogous to an immune system in which lymphocytes attack pathogens and then create "memory cells" which live in the bone marrow. If a pathogen is seen again, these memory cells can be employed to create the precise lymphocytes needed to fight the pathogen, without taking the time to learn their behavior/weaknesses again. Many variations are possible. Details relating to the disclosed technology are explained below.

FIG. 1 illustrates an example system 100 including an example fraud detection module 102 configured to detect fraud based on long-term patterns, according to an embodiment of the present disclosure. The fraud can relate to any illegitimate activity committed in an online environment or platform, such as a social networking system. The fraud detection module 102 can include a long-term machine learning module 104 and a short-term machine learning module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the fraud detection module 102 can be implemented in any suitable combinations. For illustrative purposes, the disclosed technology is described in connection with content associated with a social networking system, but the disclosed technology can apply to any type of content and/or activities as well as any type of application and/or system. In addition, the disclosed technology can apply to identifying characteristics other than fraud that have long-term patterns.

The long-term machine learning module 104 can provide a machine learning model trained based on long-term data. For example, the long-term machine learning module 104 can train one or more long-term machine learning models based on long-term content data. The trained one or more long-term machine learning models can be incorporated as features into a short-term machine learning model. The functionality of the long-term machine learning module 104 is described in more detail herein.

The short-term machine learning module 106 can provide a machine learning model trained based on short-term data. For example, the short-term machine learning module 106 can train a short-term machine learning model based on short-term content data. The trained short-term machine learning models can be applied to content associated with a social networking system to determine whether certain content is fraudulent or not. The functionality of the short-term machine learning module 106 is described in more detail herein.

In some embodiments, the fraud detection module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the fraud detection module 102 can be, in part or in whole, implemented as software running on one or more computing devices or systems, such as on a server system or a client computing device. In some instances, the fraud detection module 102 can be, in part or in whole, implemented within or configured to operate in conjunction or be integrated with a social networking system (or service), such as a social networking system 630 of FIG. 6. Likewise, in some instances, the fraud detection module 102 can be, in part or in whole, implemented within or configured to operate in conjunction or be integrated with a client computing device, such as the user device 610 of FIG. 6. For example, the fraud detection module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the fraud detection module 102. The data maintained by the data store 120 can include, for example, information relating to fraud patterns, long-term machine learning models, short-term machine learning models, content data, including long-term content data, short-term content data, features, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the fraud detection module 102 can be configured to communicate and/or operate with the data store 120. In some embodiments, the data store 120 can be a data store within a client computing device. In some embodiments, the data store 120 can be a data store of a server system in communication with the client computing device.

FIG. 2A illustrates an example long-term machine learning module 202 configured to provide a machine learning model trained based on long-term data, according to an embodiment of the present disclosure. In some embodiments, the long-term machine learning module 104 of FIG. 1 can be implemented with the example long-term machine learning module 202. As shown in the example of FIG. 2A, the example long-term machine learning module 202 can include a feature determination module 204, a long-term training module 206, and a long-term evaluation module 208.

The long-term machine learning module 202 can create one or more long-term machine learning models based on long-term content data covering a specified period of time. A long-term machine learning model can capture a type of behavior and act as memory for that type of behavior. For example, the long-term machine learning model can capture a behavior based on a seasonal pattern, a particular event, etc. In some embodiments, a long-term machine learning model can be created based on a unit of time. For example, the specified period of time can be divided into a plurality of portions according to a unit of time. The long-term machine learning module 202 can create a machine learning model for each unit of time in the specified period of time and train the machine learning model for the unit of time based on content data that corresponds to the unit of time within the long-term content data. As an example, the specified period can be a year, and the unit of time can be a month in the year. The long-term machine learning module 202 can create a machine learning model for each month of the year and train the machine learning model for a month based on content data corresponding to the month in the long-term content data. A month and a year are provided examples of a unit of time and a specified period of time, but any unit of time and specified period of time can be selected as appropriate (e.g., a number of years, a year, a number of months, a month, a number of days, a day, etc.). In other embodiments, a long-term machine learning model can be created based on an event, such as an attack. A long-term machine learning model can be created and trained after a fraud attack occurs such that the long-term machine learning model can capture a behavior from that attack. The long-term machine learning module 202 can create a machine learning model for an event and train the machine learning model for the event based on a relevant portion of the long-term content data.

For example, the relevant portion can cover a period of time associated with the event. In this way, the specified period of time associated with the long-term content data can include a plurality of portions of time based on one or more events. The plurality of portions may or may not be continuous. In some embodiments, the machine learning models can be classifiers. In certain embodiments, the machine learning models can be based on decision trees, random forests, regression (e.g., linear regression), etc.

Training data can include any type of content data relating to fraud. The training data can include content data, such as content items, that has been labeled as either fraudulent or not fraudulent. The training data can include various features that can be used in detecting fraud. For example, features can relate to or can be based on accounts, advertisements, aggregation, devices, users, finance, games, locations, a mobile platform, a web platform, models, peer-to-peer (P2P) commerce, pages, ranking, rates, time, text, image, etc. Aggregation features can indicate any features that are based on aggregated data. In some embodiments, there can be two categories of features: detection-based features and memory-based features. Detection-based features can include features that do not require any previous information in order to determine values for the features. In contrast, memory-based features can include features that require some previous information and/or aggregation of information in order to determine values for the features. Examples of detection-based features can include a first time an IP address is seen, a number of seconds since a last time a credit card was added, a user age, a number of days since a first payment, etc. Examples of memory-based features can include a number of people disabled on an IP address, a number of people associated with a blacklisted credit card, a ratio of disabled people on a device, etc. Features can be in the form of numbers, texts, images, etc. Features can be selected as appropriate to train the machine learning model. All examples herein are provided for illustrative purposes, and there can be many variations and other possibilities. For example, there can be additional or different categories of features and additional or different forms of features.

The feature determination module 204 can determine types of features for training a machine learning model. For example, the feature determination module 204 can select a subset of features from a given set of features. Selected features can be relevant or optimal features (e.g., most predictive features). As explained above, features can be associated with a category and/or a form. Features associated with a particular category can be included in training data. For example, detection-based features or memory-based features can be selected to be included in the training data. In some instances, having separate machine learning models for detection-based features and memory-based features can lead to higher accuracy in prediction results. In some cases, if a machine learning model is trained based on both detection-based features and memory-based features, the machine learning model may assign higher weights to memory-based features because they may predict fraud with higher accuracy. However, this may be due to the nature of memory-based features being based on previous and/or aggregated information. For example, a memory-based feature can be a ratio of disabled people on an IP address, and a value of the ratio feature for a particular IP address can become 95% over time. The value of 95% can appear to predict fraud with high accuracy. However, the machine learning model does not take into account the fact that the value of 95% was determined over time. Accordingly, separating detection-based features and memory-based features can lead to better prediction results. Features having a particular form can be included in the training data. For example, numeric features, text features, or image features can be selected to be included in the training data. Depending on the category and/or the form of features selected for training the machine learning model, the machine learning model can be categorized as a type associated with the category and/or the form of features, or a combination thereof. For example, the machine learning model can be categorized as one of the following types of machine learning models: detection-numeric, detection-text, detection-image, memory-numeric, memory-text, and memory-image. Detection-type machine learning models can help identify new frauds (e.g., unseen frauds). If a detection-type machine learning model is peaking or generating high scores, a new fraud scheme may be occurring. Memory-type machine learning models can help identify a volume attack associated with a known fraud. If a memory-type machine learning model is peaking or generating high scores, a volume attack with a known fraud may be occurring. Accordingly, having separate detection-type machine learning models and memory-type machine learning models can facilitate interpretation of content data being analyzed. In some embodiments, there can be different contexts associated with fraud detection. Examples of contexts can include advertisements, spam, P2P commerce, etc. A particular type of machine learning can be created for each context. For example, if there are two different contexts, a detection-numeric machine learning model can be created for each of the two contexts.

The long-term training module 206 can train a machine learning model based on a determined type of machine learning model. For example, for a detection-numeric machine learning model, the long-term training module 206 can select detection-based features in the form of numbers to include in training data. For a detection-text machine learning model, the long-term training module 206 can select detection-based features in the form of text to include in training data. For a detection-image machine learning model, the long-term training module 206 can select detection-based features in the form of images. Similarly, for a memory-numeric machine learning model, the long-term training module 206 can select memory-based features in the form of numbers to include in training data. For a memory-text machine learning model, the long-term training module 206 can select memory-based features in the form of text to include in training data. For a memory-image machine learning model, the long-term training module 206 can select memory-based features in the form of images. A machine learning model of a particular type, as determined by the feature determination module 204, can be created and trained for each unit of time during a specified time. For example, if the type of machine learning model is detection-numeric, a detection-numeric machine learning model can be created for each month of the past year and can be trained on content data for a corresponding month. In some embodiments, there can be multiple types of machine learning models for each unit of time. In an example, each month of the past year can have a detection-numeric machine learning model and a memory-numeric machine learning model. In certain embodiments, a machine learning model for a unit of time can be trained after a delay since content data for the unit of time may require some time to become resolved. For example, certain types of activities or transactions, such as chargebacks, can be determined after a month.

A machine learning model can be retrained based on new or updated training data. For example, if information about new content data becomes available, the long-term training module 206 can train the machine learning model based on the information about new content data. The long-term training module 206 can refine the machine learning model in order to achieve desired results, for example, by retraining the machine learning model, adjusting features or weights of the features included in the machine learning model, etc. In some cases, users may provide feedback relating to identification of content as fraudulent or not. Feedback by users can be used to train or retrain the machine learning model, for example, as a part of the training data.

The long-term evaluation module 208 can apply a trained long-term machine learning model to content, such as content items, associated with a social networking system in order to determine a score indicative of fraud for the content. A long-term machine learning model for a unit of time can assign a score that incorporates a pattern of fraud during that unit of time. A long-term machine learning model for a unit of time can be incorporated as a feature into a short-term machine learning model, as explained below. The long-term machine learning model for the unit of time can be assigned a weight based on the long-term machine learning model's prediction for short-term content data. All examples herein are provided for illustrative purposes, and there can be many variations and other possibilities.

FIG. 2B illustrates an example short-term machine learning module 252 configured to provide a machine learning model trained based on short-term data, according to an embodiment of the present disclosure. In some embodiments, the short-term machine learning module 106 of FIG. 1 can be implemented with the example short-term machine learning module 252. As shown in the example of FIG. 2B, the example short-term machine learning module 252 can include a short-term training module 254, a short-term evaluation module 256, and an action module 258.

The short-term training module 254 can train a short-term machine learning model based on short-term content data. The short-term content data can cover a period of time that is shorter than a specified period of time for long-term content data. The short-term content data can also cover a period of time that is shorter than a unit of time in the specified period of time for the long-term content data. For example, the short-term content data can cover 7 days or a week. A period of time for short-term content data can be selected as appropriate (e.g., a number of years, a year, a number of months, a month, a number of days, a day, etc.). In some embodiments, the machine learning model can be a classifier. In certain embodiments, the machine learning model can be based on decision trees, random forests, regression (e.g., linear regression), etc. Training data can include any type of content data relating to fraud. The training data can include content data, such as content items, that has been labeled as either fraudulent or not fraudulent. The training data can include various features that can be used in detecting fraud. Features used to train the machine learning model can be similar to features described above in connection with the long-term machine learning module 202. For example, features can relate to or can be based on accounts, advertisements, aggregation, devices, users, finance, games, locations, a mobile platform, a web platform, models, peer-to-peer (P2P) commerce, pages, ranking, rates, time, text, image, etc. Also, similar to features described above, features can fall under detection-based category or memory-based category, and features can be in the form of numbers, texts, images, etc. Features can be selected as appropriate to train the machine learning model. All examples herein are provided for illustrative purposes, and there can be many variations and other possibilities. For example, there can be additional or different categories of features and additional or different forms of features.

The short-term training module 254 can include each long-term machine learning model for a specified period of time as a feature in the short-term machine learning model. Similar to long-term machine learning models, the short-term machine learning model can be categorized as one of the following types based on the category and the form of features: detection-numeric, detection-text, detection-image, memory-numeric, memory-text, and memory-image. The short-term machine learning model can incorporate long-term machine learning models of the same type as features. As explained above, the training data for training the short-term machine learning model can include content that has been labeled as fraudulent or not fraudulent. Each long-term machine learning model, or an output (e.g., predictive score) generated by the long-term machine learning model, can be applied to the content in the training data for the short-term machine learning model. For example, the content can include one or more content items, and each long-term machine learning model can generate a score for the one or more content items. The score can indicate whether a content item is fraudulent or not. The short-term training module 254 can determine a weight for each of the long-term machine learning models, or scores thereof, based on how accurate each model's scores for content items are compared to actual fraudulent or not fraudulent labels. For example, a content item in the training data for the short-term machine learning model can have a value of 1 if the content item is labeled as fraudulent, and a value of 0 if the content item is not labeled as fraudulent. A long-term machine learning model can generate a score between 0 and 1 for the content item. The score by the long-term machine learning model for the content item and the value of the label for the content item can be compared. For example, if the content item is labeled as fraudulent with a value of 1, and a long-term machine learning model assigns a score of 0.9 to the content item, it can be determined that the long-term machine learning model is accurate for determining fraud at least for the content item. The short-term training module 254 can assign a weight to a long-term machine learning model, or a score generated by the long-term machine learning model, based on how accurate the long-term machine learning model's scores for content items are compared to values of labels for the content items.

The short-term machine learning model can be retrained based on new or updated training data. For example, if information about new content data becomes available, the short-term training module 254 can train the machine learning model based on the information about new content data. The short-term training module 254 can refine the machine learning model in order to achieve desired results, for example, by retraining the machine learning model, adjusting features or weights of the features included in the machine learning model, etc. In some cases, users may provide feedback relating to identification of content as fraudulent or not. Feedback by users can be used to train or retrain the machine learning model, for example, as a part of the training data.

The short-term evaluation module 256 can apply the trained short-term machine learning model to content associated with a social networking system to determine whether the content is fraudulent or not. The content associated with the social networking system can include one or more content items, and the trained short-term machine learning model can determine a score for a content item indicative of whether the content item is fraudulent or not. If the score satisfies a threshold value, the content item can be determined as fraudulent. If the score does not satisfy the threshold value, the content item can be determined as not fraudulent.

The action module 258 can determine whether an action should be taken regarding certain content. For example, a content item that is determined to be fraudulent can be flagged for action. There may be priority levels (e.g., high, low, etc.) associated with content items that are determined to be fraudulent. Actions can be taken as appropriate. Actions can include, for example, the social networking system automatically providing the content item for manual review, removing the content item from further publication on the social networking system, deactivating an online account associated with the content item, suspending an online account associated with the content item, etc. An action policy associated with a short-term machine learning model can specify actions to be taken with respect to content item as well as one or more threshold values for taking actions with respect to content items. As an example, the action policy can specify an action to be taken for a content item above a threshold value if the short-term machine learning model is evaluated to be a certain precision level. For instance, the action policy can block all content items above a threshold where the model was evaluated to be at least 95% precise. As another example, the action policy can specify an action to be taken for a content item if a score determined by the short-term machine learning model for the content item satisfies a threshold value. Since long-term machine learning models are incorporated into the short-term machine learning model as features, the disclosed technology does not need to maintain separate threshold values associated with one or more long-term machine learning models for taking actions with respect to content items. Accordingly, there can be just one action policy associated with the short-term machine learning model for determining whether actions should be taken with respect to content items. Having one action policy associated with the short-term machine learning model can facilitate maintenance since an administrator can manage one action policy. For example, in case of an emergency, the administrator can disable or make changes to a single action policy, rather than having to manage threshold values for a large number of long-term machine learning models. All examples herein are provided for illustrative purposes, and there can be many variations and other possibilities.

Figure 3A:
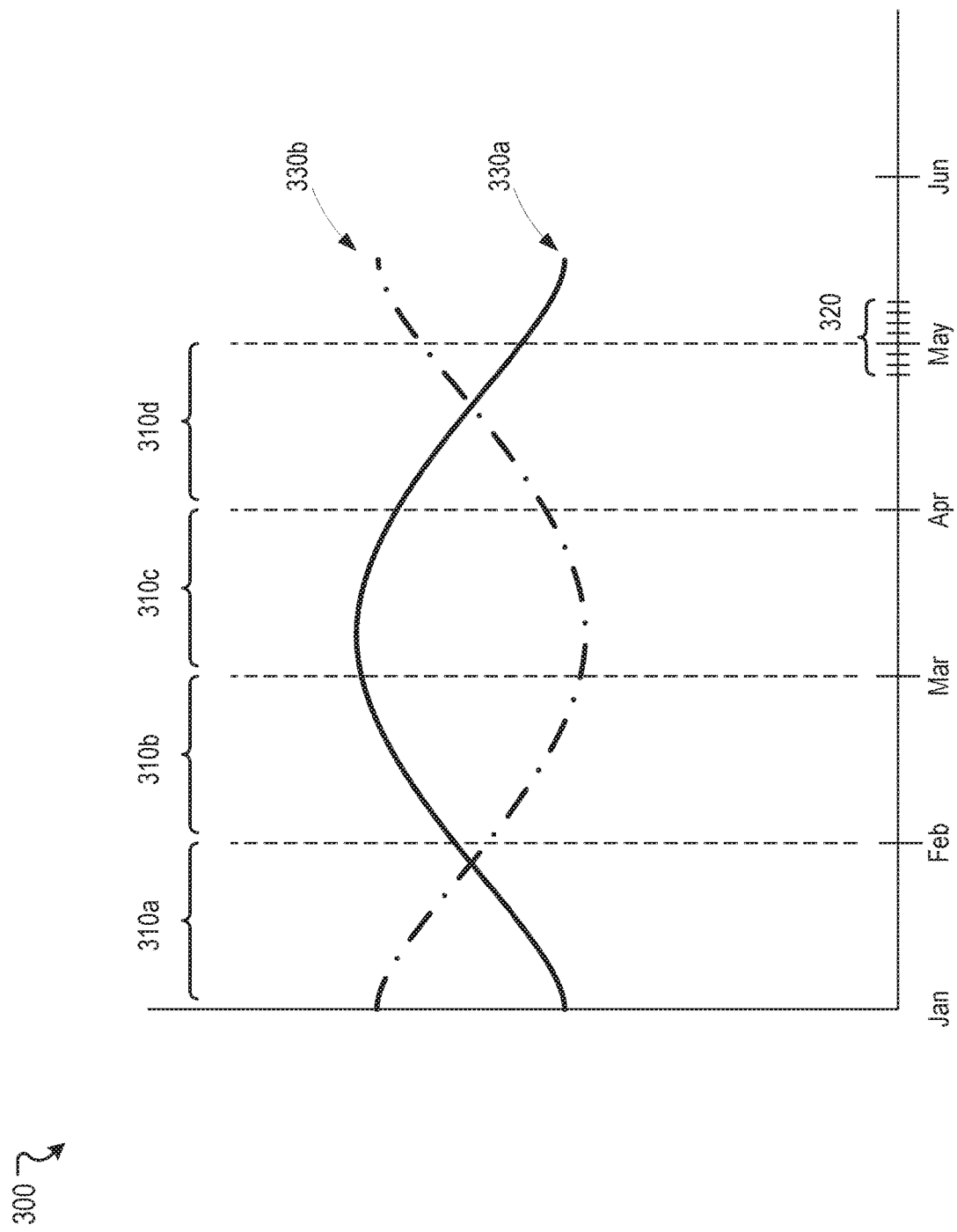
FIG. 3A illustrates a first example scenario for detecting fraud based on long-term patterns, according to an embodiment of the present disclosure.

FIG. 3A illustrates a first example scenario 300 for detecting fraud based on long-term patterns, according to an embodiment of the present disclosure. In the example scenario, a respective long-term machine learning model 310a, 310b, 310c, 310d can be created for each corresponding month from January to April. For example, the long-term machine learning model 310a can correspond to content data from January. The long-term machine learning model 310b can correspond to content data from February. The long-term machine learning model 310c can correspond to content data from March. The long-term machine learning model 310d can correspond to content data from April. The short-term machine learning model 320 can correspond to content data from a most recent week. The long-term machine learning models 310a, 310b, 310c, 310d can each be incorporated as a feature in the short-term machine learning model 320 and weighted based on prediction results for the content data for the most recent week. The example scenario 300 illustrates patterns for two different types of fraud 330a, 330b. Occurrence of a first type of fraud 330a is low in January, increases through March, and decreases through May. Occurrence of a second type of fraud 330b is high in January, decreases through March, and increases through May. In May, the first type of fraud 330a is low, and the second type of fraud 330b is high. Therefore, the short-term machine learning model 320 would weight features associated with the second type of fraud 330b higher than features associated with the first type of fraud 330a and would not be as successful in identifying the first type of fraud 330a. The long-term machine learning models 310a, 310b, 310c, 310d can help account for varying patterns associated with the first type of fraud 330a and the second type of fraud 330b. For example, the long-term machine learning model 310c for March can be effective in identifying the first type of fraud 330a since occurrence of the first type of fraud 330a is high and features associated with the first type of fraud 330a would be weighted higher in the long-term machine learning model 310c. Accordingly, the long-term machine learning model 310c may be assigned a higher weight in the short-term machine learning model 320 than weights assigned to long-term machine learning models effective in identifying other types of fraud in connection with identifying the first type of fraud 330a.

Figure 3B:
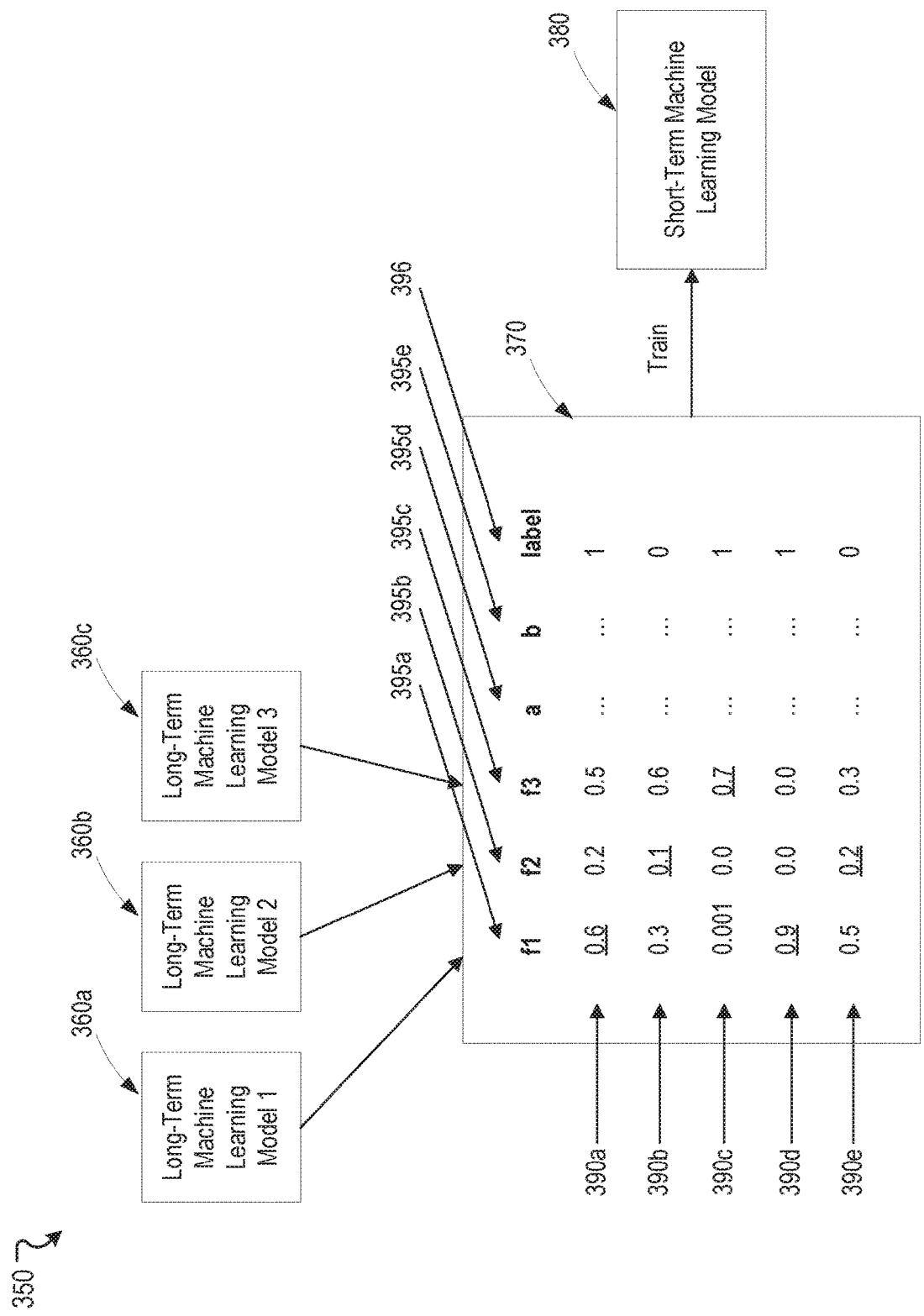
FIG. 3B illustrates a second example scenario for detecting fraud through a short-term machine learning model based at least in part on long-term patterns, according to an embodiment of the present disclosure.

FIG. 3B illustrates a second example scenario 350 for detecting fraud through a short-term machine learning model based at least in part on long-term patterns, according to an embodiment of the present disclosure. In the example scenario 350, short-term training data 370 for training a short-term machine learning model 380 includes values of various features 395 associated with content items 390. Features can include features f1 395a, f2 395b, and f3 395c, which correspond to a long-term machine learning model 1 360a, a long-term machine learning model 2 360b, and a long-term machine learning model 3 360c, respectively. Scores generated by the long-term machine learning model 1 360a, the long-term machine learning model 2 360b, and the long-term machine learning model 3 360c for content items 390 can be values of features f1 395a, f2 395b, and f3 395c for the content items 390, respectively. Features can also include features a 395d and b 395e, which can represent features other than long-term machine learning models. Values of features a 395d and b 395e are shown as ellipses for illustrative purposes, and values of features a 395d and b 395e can be in any appropriate format. The content items 390 are labeled as fraudulent or not fraudulent. For example, a label 396 for a content item 390 can indicate a value of 1 if the content item 390 is fraudulent, and a value of 0 if the content item 390 is not fraudulent. The short-term machine learning model 380 can be trained based on the short-term training data 370. The short-term machine learning model 380 can determine respective weights of the long-term machine learning models 360 based on how accurately and/or efficiently the long-term machine learning models 360 can predict or identify whether content items 390 are fraudulent or not. For example, the respective weights of the long-term machine learning models 360 can reflect how well a long-term machine learning model 360 can predict or identify content items 390 as fraudulent or not fraudulent. In the example scenario 350, the long-term machine learning model 1 360a can most accurately predict, out of all the long-term machine learning models 1 360a, 2 360b, 3 360c, whether content items 390a and 390d are fraudulent or not. The long-term machine learning model 2 360b can most accurately predict whether content items 390b and 390e are fraudulent or not. The long-term machine learning model 3 360c can most accurately predict whether a content item 390c is fraudulent or not. The weight of each long-term machine learning model 360 can be determined based on how accurately each long-term machine learning model 360 can predict or identify whether content items 390 are fraudulent or not fraudulent. The respective weights of the long-term machine learning models 360 can also reflect how efficiently or quickly the long-term machine learning models 360 can distinguish between content items 390 that are fraudulent or content items 390 that are not fraudulent. For example, in any tree-based algorithm, the respective weights can be determined such that a least number of decisions can be used to distinguish between content items 390 that are fraudulent and content items 390 that are not fraudulent.

FIG. 4 illustrates an example first method 400 for detecting fraud based on long-term patterns, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can generate one or more first machine learning models, each of the one or more first machine learning models associated with a respective portion of a first period of time. At block 404, the example method 400 can generate a second machine learning model incorporating the one or more first machine learning models as features, the second machine learning model associated with a second period of time. At block 406, the example method 400 can determine a respective weight associated with each of the one or more first machine learning models. At block 408, the example method 400 can determine whether a content item is associated with a category based on the second machine learning model. Other suitable techniques that incorporate various features and embodiments of the present disclosure are possible.

Figure 5:
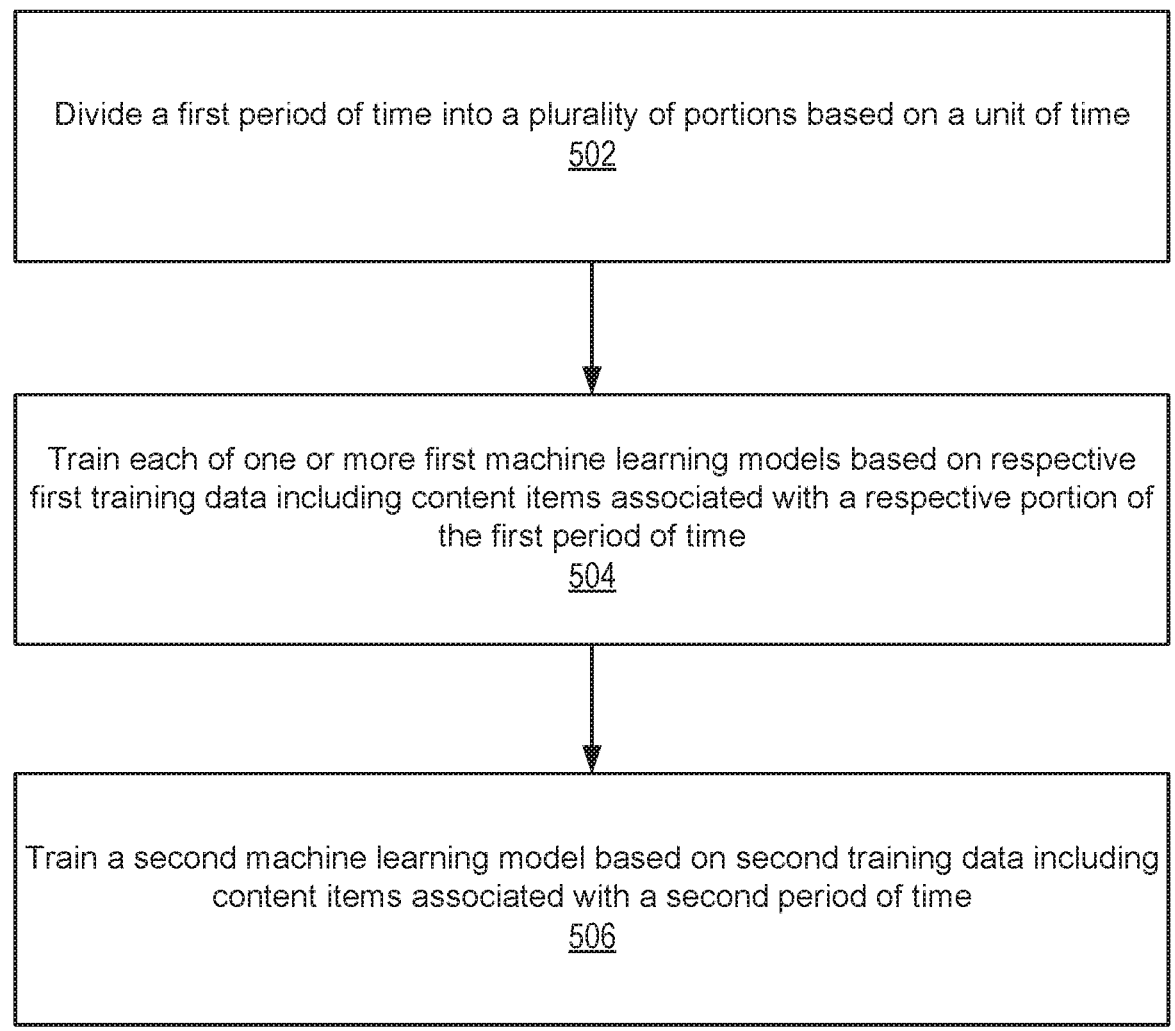
FIG. 5 illustrates an example second method for detecting fraud based on long-term patterns, according to an embodiment of the present disclosure.

FIG. 5 illustrates an example second method 500 for detecting fraud based on long-term patterns, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can divide a first period of time into a plurality of portions based on a unit of time. The first period of time can be similar to the first period of time explained in connection with FIG. 4. At block 504, the example method 500 can train each of one or more first machine learning models based on respective first training data including content items associated with a respective portion of the first period of time. The respective portion of the first period of time can be similar to the respective portion of the first period of time explained in connection with FIG. 4. The one or more first machine learning models can be similar to the one or more first machine learning models explained in connection with FIG. 4. At block 506, the example method 500 can train a second machine learning model based on second training data including content items associated with a second period of time. The second machine learning model can be similar to the second machine learning model explained in connection with FIG. 4. The second period of time can be similar to the second period of time explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
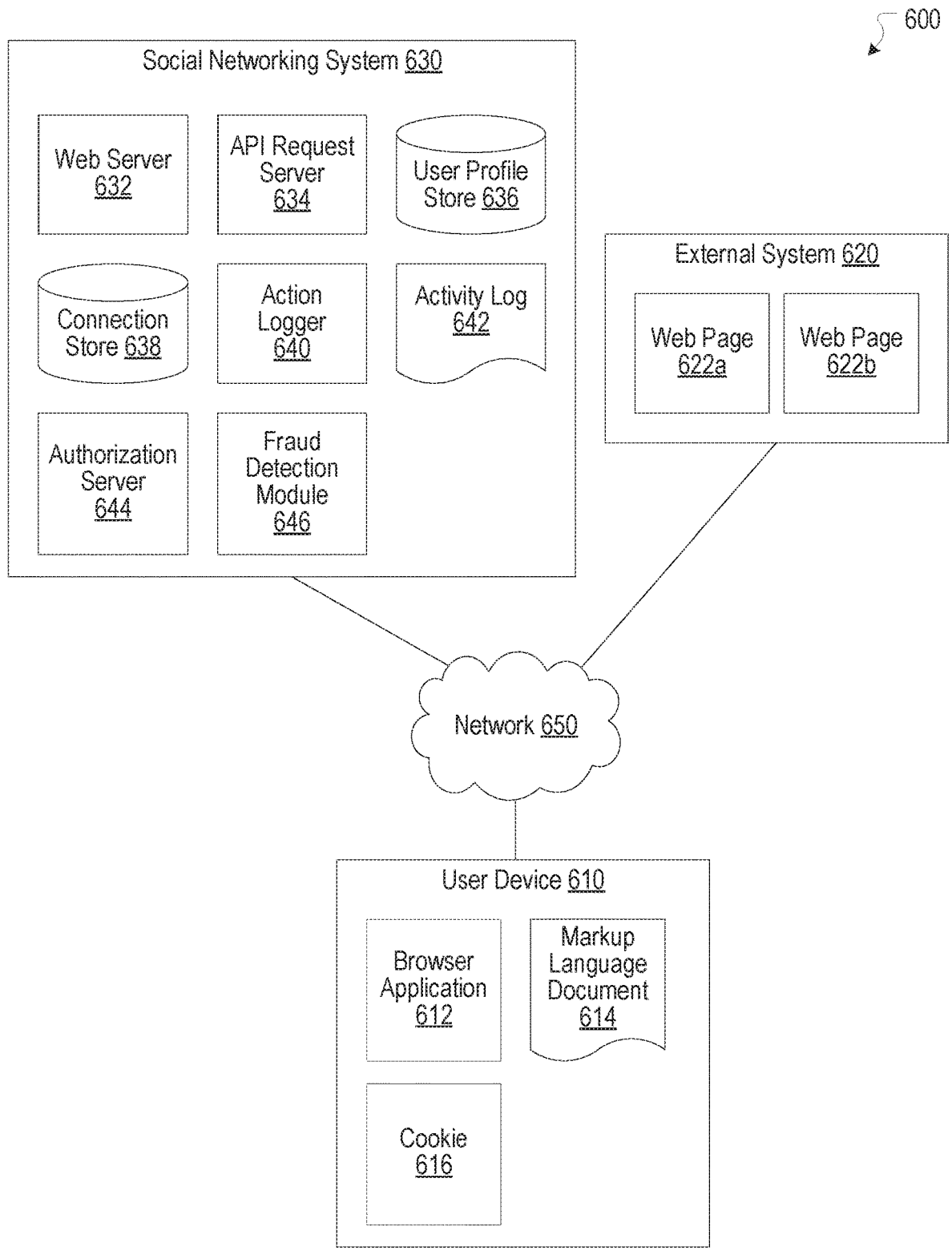
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an fraud detection module 646. The fraud detection module 646 can be implemented with the fraud detection module 102, as discussed in more detail herein. In some embodiments, one or more functionalities of the fraud detection module 646 can be implemented in the user device 610.

Hardware Implementation

Figure 7:
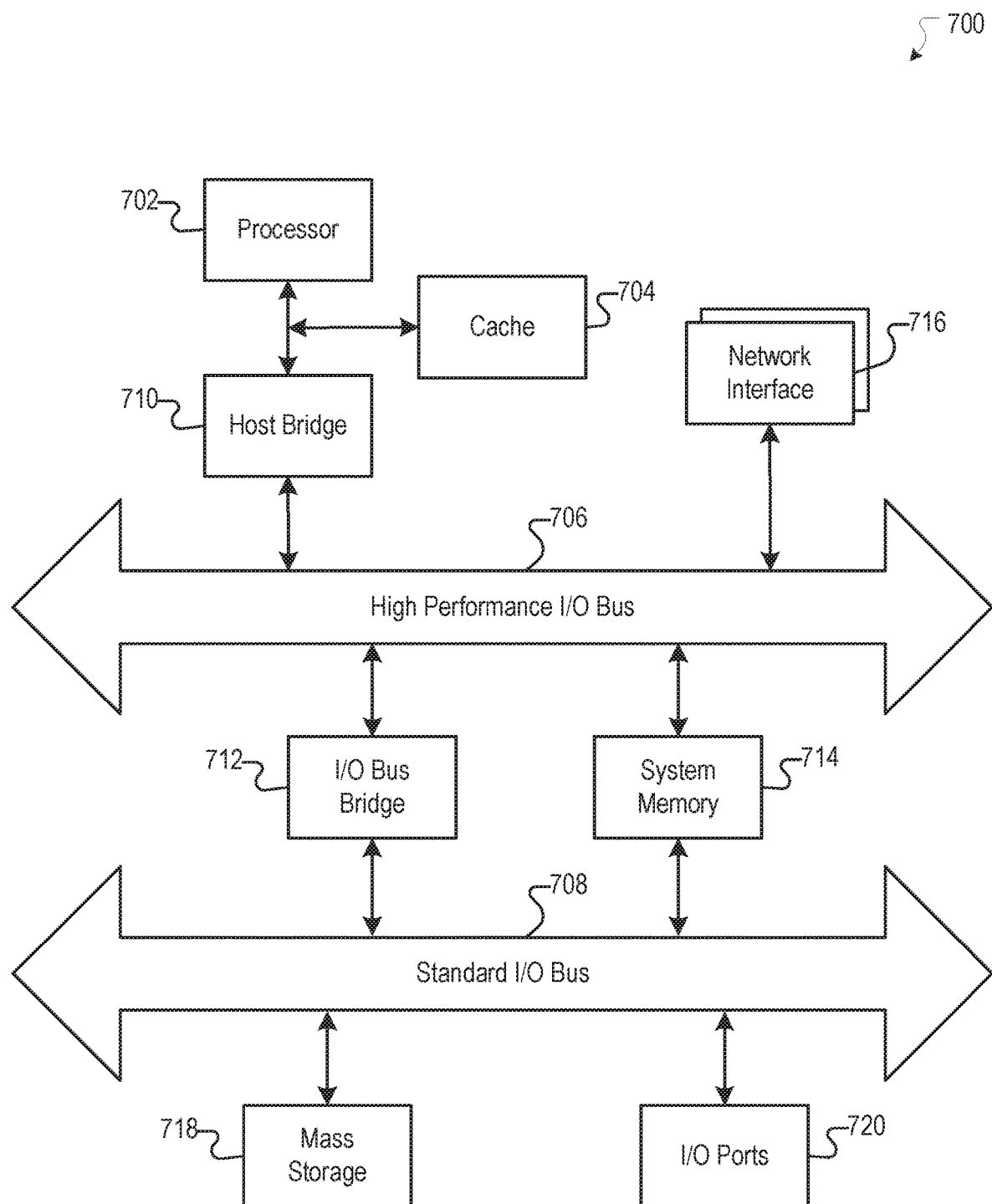
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a computing system, a first machine learning model in response to detection of an event, wherein the first machine learning model is associated with a first period of time and trained based on first training data that includes a first set of content items associated with the first period of time, wherein the first set of content items includes at least one of detection-based features or memory-based features;
    generating, by the computing system, a second machine learning model, wherein the second machine learning model is associated with a second period of time and trained based on second training data that includes weights associated with a second set of content items, wherein the weights are determined by the first machine learning model and indicate an accuracy of the first machine learning model in determination of whether each content item of the second set of content items belongs to a category related to the event; and
    determining, by the computing system, based on the second machine learning model, whether a content item is associated with the category.

2. The computer-implemented method of claim 1, wherein the first period of time is divided into a plurality of portions based on a unit of time.

3. The computer-implemented method of claim 2, wherein the first period of time is a year, the unit of time is a month, and the second period of time is a week.

4. The computer-implemented method of claim 1, wherein the second set of content items associated with the second period of time.

5. The computer-implemented method of claim 1, wherein the accuracy of the first machine learning model in the determination of whether each content item of the second set of content items belongs to the category is indicated by scores generated by the first machine learning model, wherein the scores are used as the weights associated with the second set of content items in the second training data.

6. The computer-implemented method of claim 1, wherein the second training data further includes a label assigned to each content item of the second set of content items, wherein the label indicates whether each content item of the second set of content items is fraudulent or nonfraudulent.

7. The computer-implemented method of claim 1, wherein the category relates to an online fraud or a cyclical pattern over the first period of time.

8. The computer-implemented method of claim 1, wherein the first set of content items further includes one or more of: numeric features, text features, or image features.

9. The computer-implemented method of claim 1, wherein the detection-based features are features that do not require previous information to determine values for the features.

10. The computer-implemented method of claim 9, wherein the detection based features include at least one of a time an IP address is first seen, time transpired since a credit card was added, a user age, or time transpired since a payment was made.

11. The computer-implemented method of claim 1, wherein the memory-based features are features that require previous information or aggregation of information to determine values for the features.

12. The computer-implemented method of claim 11, wherein the memory-based features include at least one of a number of people disabled on an IP address, a number of people associated with a blacklisted credit card, or a ratio of disabled people on a device.

13. A system comprising:
   at least one processor; and
   a memory storing instructions that, when executed by the at least one processor, cause the system to perform:
      generating a first machine learning-model in response to detection of an event, wherein the first machine learning model is associated with a first period of time and trained based on first training data that includes a first set of content items associated with the first period of time, wherein the first set of content items includes at least one of detection-based features or memory-based features;
      generating a second machine learning model, wherein the second machine learning model is associated with a second period of time and trained based on second training data that includes weights associated with a second set of content items, wherein the weights are determined by the first machine learning model and indicate an accuracy of the first machine learning model in determination of whether each content item of the second set of content items belongs to a category related to the event; and
      determining, based on the second machine learning model, whether a content item is associated with the category.

14. The system of claim 13, wherein the second set of content items associated with the second period of time.

15. The system of claim 13, wherein the accuracy of the first machine learning model in the determination of whether each content item of the second set of content items belongs to the category is indicated by scores generated by the first machine learning model, wherein the scores are used as the weights associated with the second set of content items in the second training data.

16. The system of claim 13, wherein the second training data further includes a label assigned to each content item of the second set of content items, wherein the label indicates whether each content item of the second set of content items is fraudulent or nonfraudulent.

17. A non-transitory computer readable medium including instructions that, when executed by at least one processor of a computing system, cause the computing system to perform a method comprising:
   generating a first machine learning model in response to detection of an event, wherein the first machine learning model is associated with a first period of time and trained based on first training data that includes a first set of content items associated with the first period of time, wherein the first set of content items includes at least one of detection-based features or memory-based features;
   generating a second machine learning model, wherein the second machine learning model is associated with a second period of time and trained based on second training data that includes weights associated with a second set of content items, wherein the weights are determined by the first machine learning model and indicate an accuracy of the first machine learning model in determination of whether each content item of the second set of content items belongs to a category related to the event; and
   determining, based on the second machine learning model, whether a content item is associated with the category.

18. The non-transitory computer readable medium of claim 17, wherein the second set of content items associated with the second period of time.

19. The non-transitory computer readable medium of claim 17, wherein the accuracy of the first machine learning model in the determination of whether each content item of the second set of content items belongs to the category is indicated by scores generated by the first machine learning model, wherein the scores are used as the weights associated with the second set of content items in the second training data.

20. The non-transitory computer readable medium of claim 17, wherein the second training data further includes a label assigned to each content item of the second set of content items, wherein the label indicates whether each content item of the second set of content items is fraudulent or nonfraudulent.

* * * * *